Oct. 28, 1969  H. J. GIRARD  3,474,479
PIPELINE CLEANING DEVICE
Filed Sept. 29, 1967  3 Sheets-Sheet 1
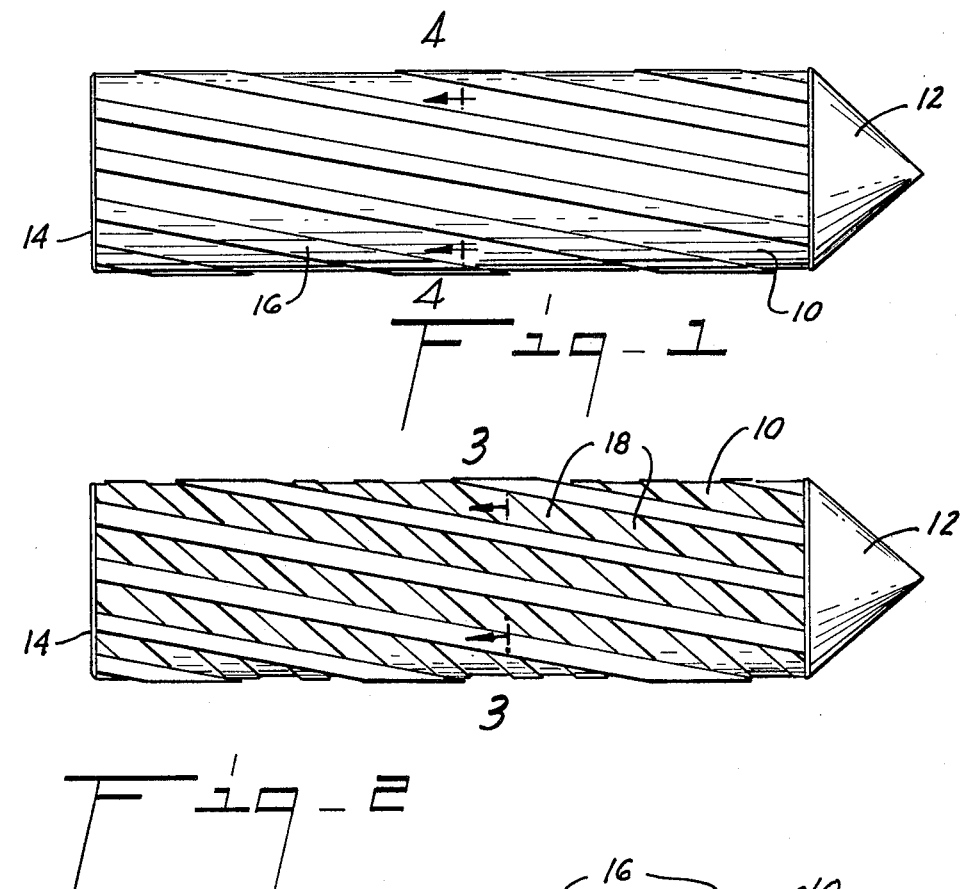
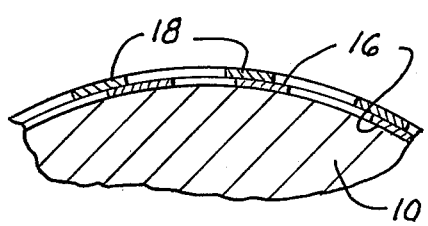
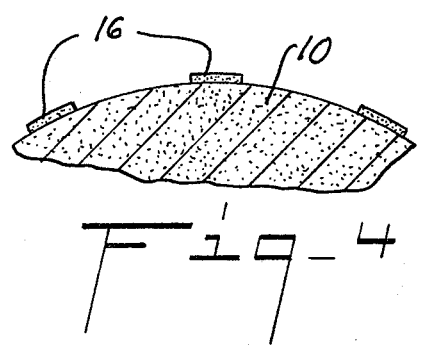
HARRY J. GIRARD
INVENTOR.
BY
Charles E. Lightfoot
ATTORNEY Oct. 28, 1969　　　H. J. GIRARD　　　3,474,479
PIPELINE CLEANING DEVICE
Filed Sept. 29, 1967　　　3 Sheets-Sheet 2
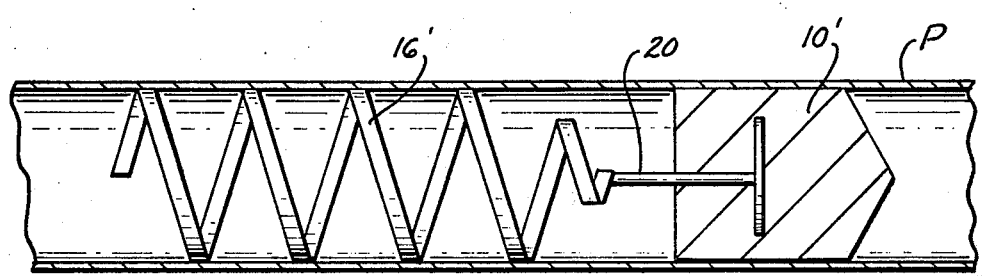
Fig_5
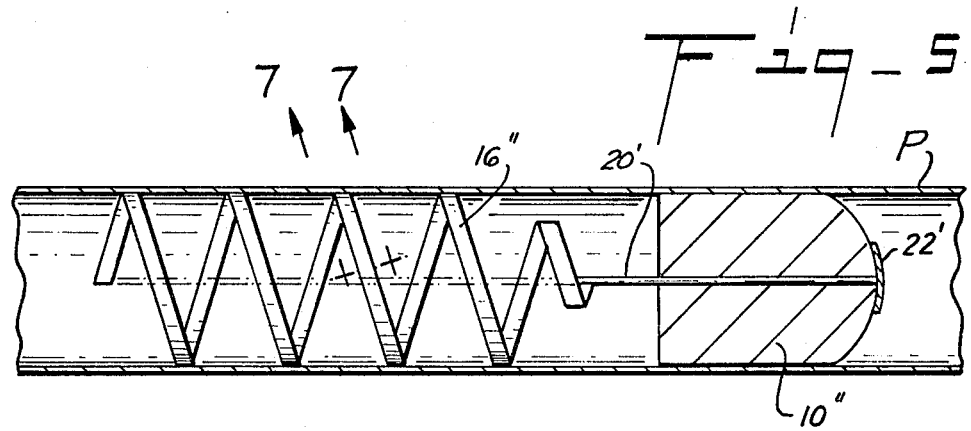
Fig_6
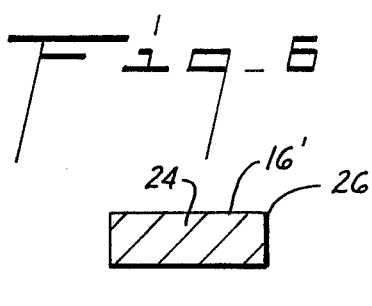
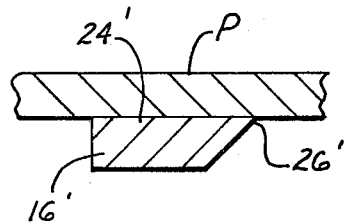
Fig_7
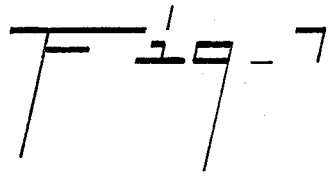
Fig_8
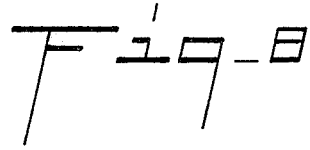
HARRY J. GIRARD
INVENTOR.
BY Charles E. Lightfoot
ATTORNEY

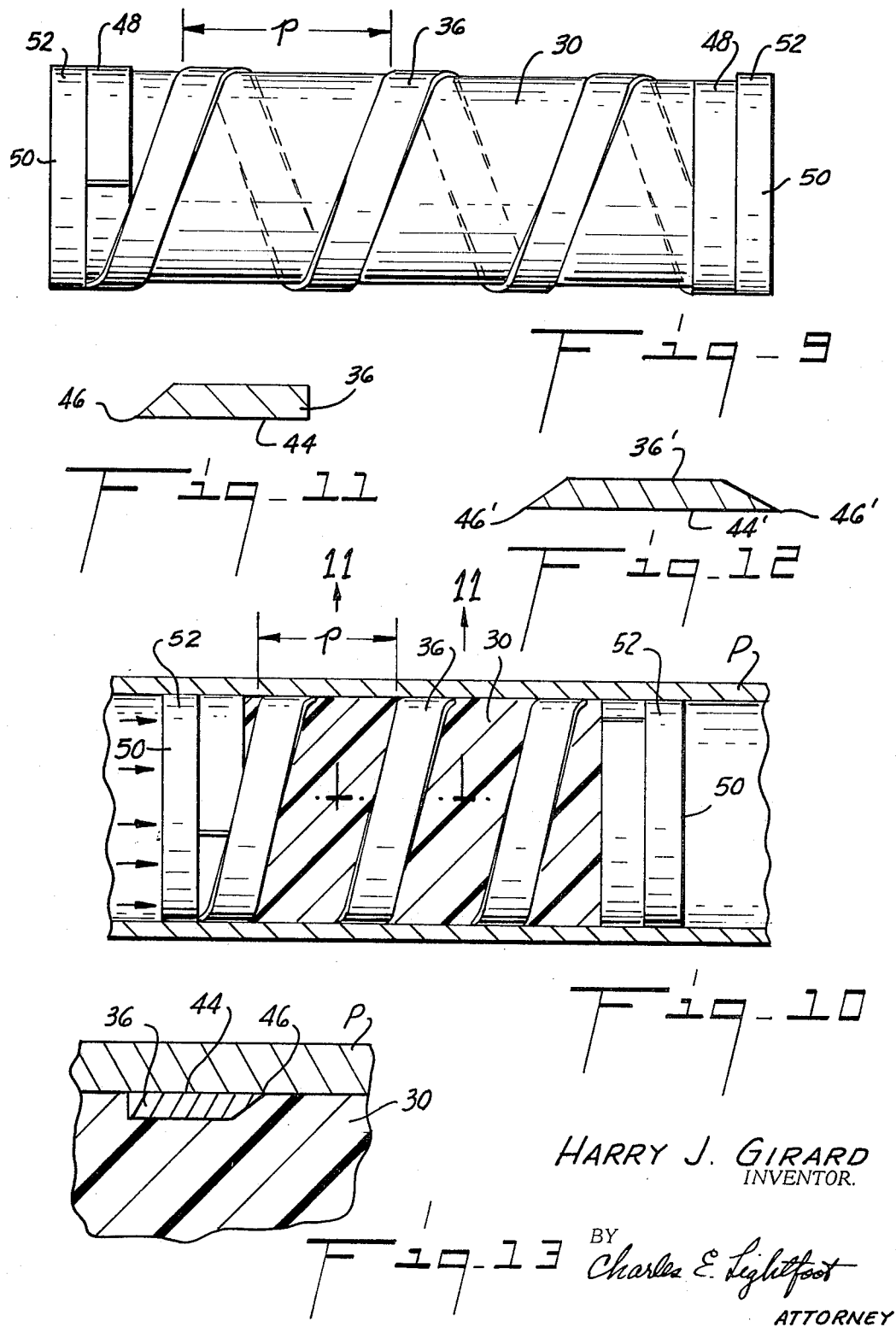

United States Patent Office 3,474,479
Patented Oct. 28, 1969

3,474,479
PIPELINE CLEANING DEVICE
Harry J. Girard, 3202 Huntingdon Place,
Houston, Tex. 77019
Filed Sept. 29, 1967, Ser. No. 676,990
Int. Cl. B08b 9/04, 9/06
U.S. Cl. 15—104.06
2 Claims

ABSTRACT OF THE DISCLOSURE

A pipeline cleaning device to be propelled through a pipeline by a pressure gradient therein and including a helically coiled or spiral cutting or scraping member shaped for scraping contact with the internal surface of the pipe, and seal forming means associated with the cutting or scraping member and positioned to close the line against the flow of fluid past the seal forming means to cause the same to be propelled with the cutting or scraping member through the pipe under the influence of the pressure of the flowing fluid. In one form of the invention the helically or spirally shaped cutting or scraping member comprises a plurality of elongated spiral strip-like elements located exteriorly about a cylindrically shaped body of seal forming material, the elements being of different pitch, so that the device will be caused to rotate about its axis during propulsion through the line to prevent non-uniform wearing of the device and to cause the elements to scrape or cut away material deposited on the surrounding wall of the pipe.

This invention relates to the cleaning of pipes and more particularly to the cleaning of pipe lines by the passing therethrough of a pipeline pig or plug which is propelled by the pressure of fluid flowing through the line.

In the operation and maintenance of pipelines, it is customary to make use of pipeline pigs or plugs of various kinds, which are inserted in the line into sealing contact with the internal surface of the pipe to be propelled therethrough by the pressure of fluid flowing in the line. Such pigs are also used to separate fluids of different character which are being transmitted through the line and are usually formed of more or less flexible and compressible material, so that they will be maintained in tight sealing contact with the pipe to prevent any flow of fluid past the pig during its passage along the line, and to permit the pig to readily pass through irregularly shaped portions or bends in the pipe. Pigs or plugs of this kind are sometimes provided with abrasive surfaces disposed for engagement with the internal surface of the pipe to scrape off corrosion or other foreign matter from the pipe.

One difficulty encountered in the use of pigs for the cleaning of pipelines is that it is usually necessary to provide means for effectively scraping or abrading the internal surface of the pipe to cut away the material adhering thereto, which then becomes mixed with the fluid in the line. Such cutting means must, of course, be of sufficient hardness and rigidity to perform its cutting function, resulting in a structure which does not easily conform to the shape of irregularities or bends in the pipe, so that the device is not easily propelled along the line and is likely to become stuck at such locations.

Moreover, as heretofore commonly constructed, it is difficult to maintain the scraping or cutting means in uniform contact with the internal surface of the pipe throughout the entire periphery thereof during the passage of the device through irregularities or bends.

A further difficulty encountered in the use of pipeline pigs of the usual kind, is that the pigs do not ordinarily rotate in moving through the line, and in the case of lines of relatively large diameter, the weight of the pig causes uneven wear to take place along the lowermost portion of the pig, so that the device is soon worn out and must be replaced.

The present invention has for an important object the provision of a pipe cleaning pig or plug embodying means for causing rotation of the same about the axis of the pipe to prevent uneven wear on the device during its passage through the line.

Another object of the invention is to provide a pipeline cleaning device which is adapted to be propelled through the line by a pressure differential in the line, and having means for causing rotation of the device during its longitudinal movement in the line and for cutting away material deposited on the internal wall of the pipe during such rotational movement.

A further object of the invention is the provision in a pipeline cleaning device of cutting or scraping means which is extensible and retractable and including means for pushing or towing the same through the pipe to allow the cutting means to conform to the shape of irregularities or bends while maintaining the same in close contact with the surface to be cleaned.

Another object of the invention is to provide a pipeline cleaning device embodying a cutting or scraping member of helical shape adapted to fit into a pipe into close scraping contact with the internal surface thereof, and including a resilient, seal forming body adapted to be propelled through the line by the pressure of fluid flowing therein and having a connection with the scraping means to tow the same through the line.

A further object of the invention is the provision of a pipeline cleaning device having a coil-like cutting or scraping member and embodying seal forming means adapted to be propelled through the pipe by the pressure of fluid flowing therethrough and which is disposed for coaction with the coil to expand the coil into tight engagement with the internal surface of the pipe while allowing sufficient flexibility and resiliency to permit the device to conform to irregularities or bends in the pipe while maintaining such close scraping contact.

Briefly described the pipeline cleaning device of the invention comprises a cutting or scraping member of generally helical shape, which is insertable in a pipeline in contact with the internal surface of the pipe and a body of resilient seal forming material associated with the cutting or scraping member which is adapted to be inserted in the pipe to close the same and to be propelled through the pipe by the pressure of fluid flowing therethrough to move the cutting or scraping member therewith through the pipe.

The above and other obvious advantages of the invention may best be understood from the following detailed description constituting a specification of the same, when considered in conjunction with the annexed drawings, wherein:

FIGURE 1 is a side elevational view of a preferred embodiment of the cleaning device of the invention;

FIGURE 2 is a side elevational view of a modified form of the same;

FIGURE 3 is a fragmentary cross-sectional view, on a somewhat enlarged scale, taken along the line 3—3 of FIGURE 2, looking in the direction indicated by the arrows;

FIGURE 4 is a fragmentary cross-sectional view, on a somewhat enlarged scale, taken along the line 4—4 of FIGURE 1, looking in the direction indicated by the arrows;

FIGURE 5 is a side elevational view, partly in cross-section, illustrating a different form of the invention, showing the same in position for propulsion along a pipeline;

FIGURE 6 is a view, similar to that of FIGURE 5, illustrating a modified form of the invention as shown in FIGURE 5;

FIGURE 7 is a cross-sectional view, on an enlarged scale, taken along the line 7—7 of FIGURE 6, looking in the direction indicated by the arrows;

FIGURE 8 is a view similar to that of FIGURE 7, illustrating a modified form of the cleaning or scraping element of the invention;

FIGURE 9 is a side elevational view illustrating another different form of the invention, showing the same ready for insertion in a pipeline to be cleaned;

FIGURE 10 is a side elevational view, partly in cross-section showing the invention as illustrated in FIGURE 9, the device being shown in its operating position in a pipeline while being propelled therethrough;

FIGURE 11 is a cross-sectional view, on an enlarged scale, taken along the line 11—11 of FIGURE 10;

FIGURE 12 is a view similar to that of FIGURE 11, illustrating a modified form of the cutting or scraping element of the invention; and FIGURE 13 is a fragmentary central, longitudinal, cross-sectional view, showing a portion of a modified form of the invention, showing the device in operating position in a pipeline, and illustrating a further modified form of the cutting or scraping element of the invention.

Referring now to the drawings in greater detail, the invention as illustrated in FIGURES 1 to 4, comprises a generally cylindrically shaped body 10, formed of flexible, resilient material, such as foam plastic, or the like, which is more or less compressible, and which may have at its forward end a portion 12, which may be formed of a somewhat less resilient material, such as rubber, and which may be of conical or other suitable shape. The body 10 may also be provided at its rear end with a disk-like portion 14 of rubber or the like.

The body 10 is preferably of somewhat larger diameter than the internal diameter of the pipe into which the body is to be inserted, so that the body initially fits the pipe snugly when inserted.

Attached to or formed on the body are external, narrow strip-like portions or elements 16, extending spirally about the body in parallel relation, substantially from end to end thereof. The portions or strips 16 may be formed on or attached to the body and are of suitable material, such as plastic, or may be of relatively hard material, such as metallic strips adapted to perform a cutting action on deposits as the body moves through the pipe.

In making use of the cleaning devices, constructed as described above, the body 10 is inserted in the pipe, the front-end portion 12 and the rear-end disk-like portion 14 being in sealing contact with the internal surface of the pipe, so that the device is propelled therethrough by the pressure of fluid flowing through the pipe. The body 10 will be compressed longitudinally somewhat by the pressure differential, so that the elements 16 are held in tight contact with the pipe, thus causing the body to rotate axially during its passage through the pipe, with the result that uneven wearing of the device is prevented.

In order to prevent the device from merely rifling or forming grooves in the material deposited on the internal wall of the pipe, as the device moves along the line, additional strip-like elements 18, similar to the strips 16 may be provided on the body, which cross over or under the strips 16, as seen in FIGURES 2 and 3 and which are arranged spirally, but on a pitch different from the pitch of the strips 16. Thus, for example, rotation of the body caused by the strips 16 penetrating deposited material in the pipe will cause the body to rotate, and due to the difference in pitch between the strips 16 and 18, the strips 18 will scrape or cut away the deposited material as the body is rotated.

A somewhat different form of the invention is illustrated in FIGURE 5 of the drawings, wherein the body 10' is formed separately from the cutting or scraping member 16', which may take the form of a stiff coil spring of steel or the like. In this form of the invention, the member 16' is connected at its forward end to the body 10', to be towed thereby through the pipe P, as by means of a rod 20 extending into the body 10' and attached thereto at its forward end, as by means of a disk 22, or the like, embedded in the body.

The body 10' is formed of flexible, resilient material, such as foam plastic, and is of a size to be fitted into the pipe in close sealing contact with the internal wall of the pipe, to be propelled therethrough by the pressure of fluid flowing through the pipe.

It will be apparent that as the device moves through the pipe, the coil 16' in contact with the internal wall of the pipe will scrape and cut away material deposited thereon, and in the event that the device is propelled through a portion of the pipe of irregular shape or around a bend in the pipe, the coil 16' will be extended to conform to the shape of the pipe while being maintained in close scraping contact therewith.

A somewhat modified form of the device as illustrated in FIGURE 5 is shown in FIGURE 6, wherein the body 10'' is similar to the body 10', and is connected to the rear end of a coil-like member 16'', as by means of a rod 20', which is extended through the body 10'' and attached at its forward end to a disk-like cap 22'.

In this form of the cleaning device the rod 20' extends through the coil 16'' which is free at its forward end, thus tending to contract the coil as it is towed through the pipe to more tightly engage the coil with the internal wall of the pipe to scrape the same.

The coils 16' and 16'' may be of any desired cross-sectional shape, such as the rectangular shape shown in FIGURE 7, which presents an external face 24 for engagement with the internal wall of the pipe to provide a spiral cutting edge 26 positioned to cut or scrape away deposits in the pipe, or which may have the shape shown in FIGURE 8, having the pipe engaging face 24' providing a blade-like edge 26' positioned to scrape the internal surface of the pipe.

The cleaning device of the invention may also take the form illustrated in FIGURES 9 to 13, wherein the body 30 is of similar construction to the body 10 of FIGURE 1, having a coil-like cutting or scraping member 36 coiled about its exterior, which coil may have any suitable cross-sectional shape, such as that shown in FIGURE 11, having the pipe engaging face 44, providing a blade-like cutting edge 46, or that shown in FIGURE 12, having the pipe engaging face 44' providing blade-like cutting edges 46', 46'.

The opposite end portions 48 of the coil 36, may be of annular shape, and within these portions, end members 50 may be fitted, which may be formed of a somewhat more rigid, but resilient material than the body 30, each of the members 50 having a portion 52 forming an external annular face positioned for sealing contact with the surrounding internal surface of the pipe.

The resilient, sponge-like body 30 substantially fills the space within the coil 36 between the solid end members 50.

In making use of the device as illustrated in FIGURES 9 to 13, the device is inserted in the pipeline in its uncompressed or extended condition, shown in FIGURE 9, in which condition the coil 36 will be in scraping contact with the internal surface of the pipe and the end members 50 will be in tight sealing engagement therewith. As the device is propelled through the pipe, the pressure of fluid in the pipe will tend to move the members 50 toward each other, so that the coil 36 and body 30 will be compressed, to urge the coil into tighter contact with the pipe while at the same time expanding the body 30 between the turns of the coil into wiping engagement with the pipe, as seen in FIGURE 10.

Under some conditions the form of the invention illustrated in FIGURES 9 to 13 may be employed without the body 30, so that the space between the end member 50 within the coil 36 forms a chamber in which the material scraped from the wall of the pipe may be retained to prevent this material from contaminating the fluid in the pipe in front of and behind the device as it moves through the pipe.

By employing a cutting or scraping coil having the two blade-like edges 46', 46', as shown in FIGURE 12, the device may be propelled in either direction through the pipe to perform its cleaning action without regard to which end of the device is inserted first into the line.

It will thus be seen that the invention, constructed and used as described above, provides a pipeline cleaning device which is useful as a means for separating different fluids which are being transmitted through a pipeline, and which also serves to effectively remove deposited material from the internal surface of the pipe as the device moves along the line.

The invention is disclosed herein in connection with particular embodiments of the same, which are to be considered as illustrative only, it being evident that various changes in the construction of the device may be made within the spirit of the invention and the scope of the appended claims.

Having thus clearly shown and described the invention, what is claimed as new and desired to be secured by Letters Patent is:

1. In a pipeline cleaning device to be propelled through a pipeline by a pressure gradient:
   (a) a body adapted to be inserted in a pipeline for sealing engagement with the surrounding wall of the pipe to close the pipe, and including
   (b) a cylindrical portion formed of resilient material, and
   (c) a first set of peripherally spaced, parallel, strip-like elements extending longitudinally spirally about the exterior of said cylindrical portion from end to end thereof in position for coaction with material deposited on the surrounding wall of the pipe to cause the body to rotate in the pipe with said strip-like portions in scraping contact with said surrounding wall during longitudinal movement of the body through the pipe, a second set of spaced parallel strip-like elements underlying the first set and spiralling longitudinally about the exterior of the cylindrical portion all being wound in the same direction of the first set of strip-like elements, but having a different pitch than the strips of the first set.

2. In a pipeline cleaning device to be propelled through a pipeline by a pressure gradient:
   (a) a body adapted to be inserted in a pipe line for sealing engagement with the surrounding wall of the pipe to close the pipe, and including
   (b) a cylindrical portion formed of resilient material, and
   (c) peripherally spaced, parallel, strip-like spiral portions wound in the same direction but of different pitch and extending longitudinally about the exterior of said cylindrical portion from end to end thereof in position for coaction with material deposited on the surrounding wall of the pipe to cause the body to rotate in the pipe with said strip-like portions in scraping contact with said surrounding wall during longitudinal movement of the body through the pipe.

References Cited

UNITED STATES PATENTS

| | | | |
|---|---|---|---|
| 1,673,890 | 6/1928 | Smith | 15—104.06 |
| 2,810,143 | 10/1957 | Reynolds | 15—104.06 |
| 3,204,274 | 9/1965 | Knapp | 15—104.06 |
| 3,389,417 | 6/1968 | Knapp et al. | 15—104.06 |
| 1,634,094 | 6/1927 | Cook et al. | 15—104.06 |

EDWARD L. ROBERTS, Primary Examiner